United States Patent [19]

Toshkov et al.

[11] 3,954,727

[45] May 4, 1976

[54] METHOD OF PRODUCING MICROCRYSTALLINE CELLULOSE

[75] Inventors: Toshko Sokolov Toshkov; Nikola Russev Gospodinov; Evstati Penchev Vidimski, all of Sofia, Bulgaria

[73] Assignee: DSO"Pharmachim", Sofia, Bulgaria

[22] Filed: Aug. 2, 1974

[21] Appl. No.: 494,315

[30] Foreign Application Priority Data

Aug. 2, 1973  Bulgaria.................................. 24254

[52] U.S. Cl. ................................................. 260/212
[51] Int. Cl.² .......................................... C08B 1/00
[58] Field of Search ..................................... 260/212

[56] References Cited
UNITED STATES PATENTS

| | | |
|---|---|---|
| 1,964,772 | 7/1934 | Schur et al........................... 260/212 |
| 2,218,235 | 10/1940 | Fletcher et al....................... 260/212 |
| 2,698,625 | 1/1955 | Bitzer.................................... 260/212 |
| 2,978,446 | 4/1961 | Battista et al........................ 260/212 |
| 3,052,593 | 9/1962 | Battista................................ 260/212 |
| 3,141,875 | 7/1964 | Battista et al........................ 260/212 |
| 3,146,168 | 8/1964 | Battista................................ 260/212 |
| 3,278,519 | 10/1966 | Battista et al........................ 260/212 |
| 3,345,357 | 10/1967 | Cruz..................................... 260/212 |

*Primary Examiner*—Ronald W. Griffin

[57] ABSTRACT

Method of producing microcrystalline cellulose. Cellulose containing at least about 92% alpha-cellulose and 5 – 6.5% beta cellulose, having a solubility in 5% sodium hydroxide of about 2 to 4% and a viscosity 110 to 180 mP is acid hydrolyzed and the resulting crystalline mass is de-aggregated, the acid hydrolysis being performed at the same time as the chemical de-aggregating of the material. The de-aggregated material may be bleached and cleaned if desired.

4 Claims, No Drawings

METHOD OF PRODUCING MICROCRYSTALLINE CELLULOSE

The invention relates to a method of producing microcrystalline cellulose which is used, for example, as a filling agent in the chemical-pharmaceutical industry, the food industry, and in other industries.

A method is known for producing microcrystalline cellulose for the purposes mentioned above by hydrolyzing natural hydrate-cellulose with 2.5 n hydrochloric acid at 105°C until the limit of polymerization is attained. The product thus obtained is submitted to mechanical crushing, and in the form of a white powder is used as a filling agent in the food industry, the pharmaceutical, and other types of industry. (S. A. Rogovin, "Chemistry of cellulose", Ed. "Himija", 171, Moscow, 1972; U.S. Pat. No. 2,978,446, 1961; O. A. Battista, P. A. Smith, Industrial and Engineering Chemistry, 20–28, 1960.)

Methods have been proposed for producing microcrystalline cellulose by hydrolyzing cellulose with solutions of sulphuric acid or of diluted hydrochloric acid, usually 0.5%, in an autoclave at 110° to 130°C with a duration of the process of 3.6 to 5.4 ks (kiloseconds) while fixing the time for every case separately. The hydrolysis product consists of the crystal fraction of the starting material, without entirely destroying its fibrous structure. In order to achieve a complete separation and homogenization of the microcrystals after the hydrolysis, the product is submitted to a fine grinding in a colloid mill in an aqueous medium (A. S. Andres, "Quimica e industria", Volumen 14, Enero-Pebrero 1967).

In the known methods for producing microcrystalline cellulose after terminating the process of hydrolysis, the treated material still remains its fibrous structure including the microcrystals; this hinders its use for the purposes described above.

In order to destroy the fibrous structure, to separate the microcrystals, and to homogenize the product, it is necessary to submit the material after the process of hydrolysis to an additional mechanical de-aggregation, e.g. by grinding in a colloid mill. This makes the manufacturing process more time-consuming, more expensive, and more complicated.

The carrying out of the hydrolysis process with a 2.5 n hydrochloric acid requires a high consumption of acid for each unit of the product. It is disclosed in U.S. Pat. No. 2,978,446 (1961) that hydrochloric acid is to be preferred due to its fast action with a specific de-branching of the 1.4 glucoside linkages while ensuring an output which is 30% higher than the output obtained by using sulphuric acid under the same conditions. Hydrochloric acid, however, is a strong corrosive agent and in working at elevated concentrations and temperatures it hampers the maintenance of the required hygienic-sanitary conditions in the working compartments of the apparatus employed.

This invention has among its objects the provisions of an improved method for producing microcrystalline cellulose used in the chemical-pharmaceutical industry, the food industry, and in other industrial branches by means of hydrolyzing and deaggregating the hydrolysis product.

According to the invention this is achieved by hydrolyzing with dilute acids at a hydrolysis criterium 0.003 to 0.300, cellulose containing at least about 92% alpha-cellulose, 5 to 6.5% beta-cellulose and having a solubility in 5% sodium hydroxide of about 2 to 4% and a viscosity of 110 to 180 mP. Along with the hydrolysis there is also carried out the chemical de-aggregation of the product. It is preferred to perform the process with a dilute sulphuric acid with a concentration of 1% and at temperatures of 120° to 160°C.

In a preferred embodiment of the method, the mass obtained after terminating the hydrolysis and the de-aggregation is submitted to bleaching, the bleaching agent preferably being the peroxides. The de-aggregated mass, eventually bleached, can be cleaned from mechanical impurities. The purified suspension is washed and dried.

The advantages of the process consist in the simplifying and intensifying of the manufacturing process for the production of microcrystalline cellulose due to performing the hydrolysis and the de-aggregation at the same time while achieving a high output of the end product, and by using sulphuric acid that offers preferred corrosive and hygienic-sanitary working conditions. The degree of elimination of mechanical impurities is increased from 3 to 7 times.

The invention will now be described with the following examples.

EXAMPLE 1

To a 1%-solution of sulphuric acid there is added cellulose containing 92% alpha-cellulose and 6.5% beta-cellulose to form a cellulose-acid mass or mixture. The cellulose has a solubility in 5% sodium hydroxide of 3.5% and a viscosity of 140 mP. The cellulose-acid mass is prepared with a concentration of 5% and while agitating is poured in an autoclave that is heated at a uniform rate, the temperature increasing from 100° to 160°C in 2.4 ks. The autoclave is maintained at a temperature of 160°C for 1.2 ks more, and afterwards the mass is cooled. The microcrystalline cellulose is separated from the hydrolysate, is washed and dried. The output of microcrystalline cellulose is 88%.

EXAMPLE 2

To a 1%-solution of sulphuric acid there is added cellulose containing 93% alpha-cellulose and 5% beta-cellulose to form a cellulose acid-mass or mixture. The cellulose has a solubility in 5%-sodium hydroxide of 3.5%, a viscosity of 160 mP, a whiteness of 85%, and 450 particles of mechanical impurities /m$^3$. The cellulose-acid mass is prepared with a concentration of 5% and while being agitated is poured in an autoclave where it is heated at a uniform rate so that in 2.7 ks the temperature increases from 100° to 130°C. The autoclave is maintained at 130°C for 2.7 ks more and afterwards the mass is cooled. The microcrystalline cellulose is separated from the hydrolysate and is washed. The washed microcrystalline cellulose is diluted with water to a concentration of 10%, is then alkalized and bleached with 5g/dm$^3$ hydrogen peroxide at ph 9 and at a temperature of 90°C. The leached suspension is washed and cleaned from mechanical impurities in a centrifugal cleaning installation at a 3% concentration of the suspension and afterwards it is dried. The output of microcrystalline cellulose product is 86%.

Although the invention is described with reference to a plurality of embodiments thereof, it is to be expressly understood that it is in no way limited to the disclosure of such a plurality of preferred embodiments, but is capable of numerous modifications within the scope of the appended claims.

What is claimed is:

1. A method of producing microcrystalline cellulose from a cellulose containing at least 92% alpha-cellulose and 5 – 6.5% beta cellulose, having a solubility in 5%-sodium hydroxide of 2 to 4% and a viscosity of 110 to 180 mP, comprising hydrolyzing with dilute acid said cellulose at a hydrolysis criterium 0.003 to 0.300, and simultaneously de-aggregating the resulting crystalline mass.

2. A method according to claim 1, wherein the acid hydrolysis is carried out with dilute sulphuric acid.

3. A method according to claim 2, wherein the sulphuric acid has a concentration of 1%.

4. A method of producing microcrystalline cellulose from a cellulose containing at least 92% alpha-cellulose and a 5–6.5% beta-cellulose, having a solubility in 5% - sodium hydroxide of 2 to 4% and a viscosity of 110 to 180 mP, comprising hydrolizing with dilute acids said cellulose by mixing the acid with the cellulose, heating the cellulose-acid mass to an elevated temperature of from 120° to 160°C, maintaining said mass at said elevated temperature for 20 to 45 minutes, thereafter cooling the mass, and separating the microcrystalline cellulose from the hydrolysate, whereby to de-aggregate the resulting crystalline mass simultaneously with the hydrolizing thereof with said dilute acid.

* * * * *